United States Patent
Gao et al.

(10) Patent No.: US 12,052,977 B1
(45) Date of Patent: Aug. 6, 2024

(54) CONNECTING BUCKLE WITH RETURN DEVICE

(71) Applicant: Foshan Tuorun Precision Hardware Technology Co., Ltd, Guangdong (CN)

(72) Inventors: Maoyang Gao, Guangdong (CN); Jianwei Yin, Guangdong (CN)

(73) Assignee: Foshan Tuorun Precision Hardware Technology Co., Ltd, Foshan (CN)

( * ) Notice: Subject to any disclaimer, the term of this patent is extended or adjusted under 35 U.S.C. 154(b) by 0 days.

(21) Appl. No.: 18/126,441

(22) Filed: Mar. 26, 2023

(30) Foreign Application Priority Data

Feb. 9, 2023 (CN) .......................... 202320192583.7

(51) Int. Cl.
*A01K 27/00* (2006.01)
*A44B 11/24* (2006.01)

(52) U.S. Cl.
CPC ............ *A01K 27/005* (2013.01); *A44B 11/24* (2013.01)

(58) Field of Classification Search
CPC ....... A01K 27/005; A44B 11/24; F16B 45/06; F16B 45/035; F16B 45/02; Y10T 24/45293; Y10T 24/45702
See application file for complete search history.

(56) References Cited

U.S. PATENT DOCUMENTS

| | | | | |
|---|---|---|---|---|
| 2,234,853 A * | 3/1941 | Brueggeman | ........... | F16B 45/06 24/375 |
| 2,476,734 A * | 7/1949 | Jellison | ................. | F16B 45/035 24/598.5 |
| 2,518,889 A * | 8/1950 | Henderson | ............. | B64D 17/32 24/598.5 |
| 2,637,088 A * | 5/1953 | Foster | ..................... | F16B 45/06 294/118 |
| 3,640,555 A * | 2/1972 | Raschke | ................. | F16G 11/00 248/331 |
| 6,237,201 B1 * | 5/2001 | Bonaiti | .................... | F16B 45/06 24/601.5 |
| 6,463,640 B1 * | 10/2002 | Toth | ..................... | A44B 11/266 24/702 |
| 6,654,990 B2 * | 12/2003 | Liu | ........................ | F16B 45/06 24/598.5 |

(Continued)

FOREIGN PATENT DOCUMENTS

CN 212728442 U 3/2021

*Primary Examiner* — Robert Sandy
*Assistant Examiner* — Rowland Do

(57) ABSTRACT

Disclosed is a connecting buckle with a return device, including an upper cover and a lower cover disposed correspondingly, where a buckled cavity is formed between the upper cover and the lower cover, a rotating shaft, a locking device and a return device are disposed in the buckled cavity. The locking device includes an upper locking tongue and a lower locking tongue. A locking spring is disposed at the bottom of the buckled cavity, and the return device includes an upper return tongue and a lower return tongue, the upper return tongue is hinged to the lower locking tongue, the lower return tongue is hinged to the upper locking tongue, and the upper return tongue and the lower return tongue are hinged to each other. The connecting buckle with the return device has the advantages of convenience in locking and unlocking, relatively good safety and stability, and good versatility.

10 Claims, 10 Drawing Sheets

(56) References Cited

U.S. PATENT DOCUMENTS

| | | | | |
|---|---|---|---|---|
| 6,965,231 | B1* | 11/2005 | Cinoglu | A61B 5/055 |
| | | | | 324/307 |
| 11,064,682 | B2* | 7/2021 | Wong | A01K 27/003 |
| 11,125,266 | B2* | 9/2021 | Garvey | F16B 45/035 |
| 11,330,802 | B1* | 5/2022 | Yin | F16B 45/06 |
| 11,746,822 | B2* | 9/2023 | Bowerman | F16B 45/02 |
| | | | | 24/598.4 |
| 2015/0335104 | A1* | 11/2015 | Dickie | A44B 13/02 |
| | | | | 24/500 |
| 2017/0241470 | A1* | 8/2017 | Vaccari | F16B 45/034 |

* cited by examiner

CONNECTING BUCKLE WITH RETURN DEVICE

CROSS REFERENCE TO RELATED APPLICATIONS

The present application claims the benefit of Chinese Patent Application No. 202320192583.7 filed on Feb. 9, 2023, the contents of which are incorporated herein by reference in their entirety.

TECHNICAL FIELD

The present application relates to the technical field of connecting buckles, and in particular relates to a connecting buckle with a return device.

BACKGROUND

With the improvement of living standards of people, pets have gradually become part of people's family members. To avoid accidents when taking the pet out, it is essential to wear a leash for the pet. A pet leash is provided with a connecting buckle for connecting a leash to a pet collar. The existing connecting buckle generally uses the structure of a spring ring buckle, where the spring ring buckle is provided with an elastic rod that can be pressed to the inner side of the ring, so that the ring buckle is provided with a notch that can be sleeved on a pet collar connecting ring. The pet collar connecting ring is sleeved on the ring buckle along the notch, and the elastic rod rebounds due to an elastic effect to close the notch, so that a leash fixed to one end of the spring ring buckle is connected to the pet collar. However, in the connecting buckle with such structure, the elastic rod rotates to the inner side of the ring buckle under pressure. People exert a force on the elastic rod to the inner side of the ring buckle and put a connecting ring into the inner side of the ring buckle, which is inconvenient to operate, and the elastic rod is loosened due to stress, so that the pet collar connecting ring is easily separated from the spring ring buckle, having certain potential safety hazards.

As shown in FIG. 1, in a patent with the publication number of CN212728442U, a quick opening and closing buckle is disclosed, including a fastener body and a connecting ring 14, where the fastener body includes two connecting pieces 1 disposed in parallel, the two connecting pieces 1 are respectively provided with a U-shaped groove 4, the two U-shaped grooves 4 are arranged opposite to each other, groove openings of the U-shaped grooves 4 are formed on the head ends of the connecting pieces 1, a buckle assembly is disposed between the two connecting pieces 1, and the buckle assembly includes a left hook piece 5, a right hook piece 6 and a torsional spring 7. The left hook piece 5 and the right hook piece 6 are closed under the action of torsion of the torsional spring 7, and the left hook piece 5 and the right hook piece 6 can be separated for opening after overcoming an acting force of the torsional spring 7. In this solution, the groove openings of the U-shaped grooves 4 can be opened by shifting two shift blocks 11, a buckle is convenient to open and close, and the safety is relatively high. However, this technical solution has the following defects: 1, the two shift blocks 11 can be separately shifted, so that the torsional spring 7 is non-uniformly stressed and thus is relatively short in service life; 2, when the buckle is opened, due to a counter-acting force of the torsional spring 7, the pet collar connecting ring is easy to be stuck between a first triggering rod 502 and a second triggering rod 602, and thus the pet collar is difficult to take out; and 3, an end cover 2 must be fixedly connected to a vertical shaft 12 to ensure the safety of the leash, and the connecting ring 14 is difficult to replace, which cannot meet diverse needs of users.

For this reason, a connecting buckle with a return device is provided.

SUMMARY

The objective of the present application is to provide a connecting buckle with a return device, which has the advantages of convenience in locking and unlocking, relatively good safety and stability, and good versatility.

To achieve the above objective, the present application adopts the following technical solution:

a connecting buckle with a return device, including an upper cover and a lower cover disposed correspondingly, where U-shaped connecting grooves are correspondingly formed in the head ends of the upper cover and the lower cover respectively, two first riveting shafts are disposed on two sides of the connecting grooves, a second riveting shaft and buckle ring installing grooves are disposed at the tail ends of the upper cover and the lower cover, a buckle ring fixing shaft is disposed in the buckle ring installing grooves, a buckle ring is disposed at the tail end of the buckle ring fixing shaft, a buckled cavity is formed between the upper cover and the lower cover, a rotating shaft, a locking device and a return device are disposed in the buckled cavity, and the locking device and the return device are disposed correspondingly;

the locking device includes an upper locking tongue and a lower locking tongue disposed correspondingly, where the upper locking tongue is provided with an upper locking groove with an opening on the right side, an upper rotating hole corresponding to the rotating shaft is formed in the tail end of the upper locking tongue, an upper shift lug is protrusively disposed on the left side of the upper locking tongue, the lower locking tongue is provided with a lower locking groove with an opening on the left side, a lower rotating hole corresponding to the rotating shaft is formed in the tail end of the lower locking tongue, a lower shift lug is protrusively disposed on the right side of the lower locking tongue, a limit stopper for blocking the upper shift lug and the lower shift lug are disposed at the bottom of the buckled cavity, a locking spring abutting against the tail ends of the upper locking tongue and the lower locking tongue is also disposed at the bottom of the buckled cavity, and a closed ring is formed between the head ends of the upper locking tongue and the lower locking tongue as well as the connecting grooves due to an elastic force of the locking spring; and the return device includes an upper return tongue and a lower return tongue that are L-shaped and disposed correspondingly, where the head end of the upper return tongue is hinged to the head end of the lower locking tongue, the head end of the lower return tongue is hinged to the head end of the upper locking tongue, the tail ends of the upper return tongue and the lower return tongue are hinged to each other, and the upper return tongue and the lower return tongue are located on the outer side of the connecting grooves due to the elastic force of the locking spring.

Furthermore, two corresponding spring fixing grooves are formed in the bottom of the buckled cavity, and the locking spring is compression springs disposed in the two spring fixing grooves respectively.

Furthermore, the locking spring is a twins torsional spring, torsional spring installing holes are formed in tails ends of the upper locking tongue and the lower locking tongue, and torsional spring installing shafts corresponding to the torsional spring installing holes are disposed at two ends of the twins torsional spring.

Furthermore, the two first riveting shafts abut against the head ends of the upper locking tongue and the lower locking tongue respectively.

Furthermore, when the upper shift lug and the lower shift lug are in contact with the limit stopper, the hinged ends of the upper return tongue and the lower return tongue are overlapped and flush with each other.

Furthermore, two corresponding positioning columns are protrusively disposed at the tail end of the upper cover, and two positioning grooves corresponding to the positioning columns are disposed at the tail end of the lower cover.

Furthermore, a guiding groove of which the width is gradually reduced is formed in the middle of each positioning column, and a guiding column corresponding to the guiding groove is disposed in the middle of each positioning groove.

Furthermore, the upper cover is provided with an upper limit block corresponding to the locking device, the lower cover is provided with a lower limit block corresponding to the locking device, the upper limit block and the lower limit block are disposed correspondingly, the upper limit block is provided with a positioning hole, and the lower limit block is provided with a protruded positioning shaft corresponding to the positioning hole.

Furthermore, when the upper shift lug and the lower shift lug are in contact with the limit stopper, the tail end of the upper limit block abuts against the upper return tongue, and the tail end of the lower limit block abuts against the lower return tongue.

Furthermore, the buckle ring installing groove is provided with a riveting hole matched with the second riveting shaft, and an anti-dropping head is disposed at the tail end of the buckle ring fixing shaft.

The present application includes the upper cover and the lower cover disposed correspondingly, where the buckled cavity is formed between the upper cover and the lower cover, the rotating shaft, the locking device and the return device are disposed in the buckled cavity, the locking device includes the upper locking tongue and the lower locking tongue disposed correspondingly, the upper rotating hole corresponding to the rotating shaft is formed in the tail end of the upper locking tongue, the lower rotating hole corresponding to the rotating shaft is formed in the tail end of the lower locking tongue, the locking spring is disposed at the bottom of the buckled cavity, the return device includes the upper return tongue and the lower return tongue that are L-shaped and disposed correspondingly, the head end of the upper return tongue is hinged to the head end of the lower locking tongue, the head end of the lower return tongue is hinged to the head end of the upper locking tongue, and the tail ends of the upper return tongue and the lower return tongue are hinged to each other. The connecting buckle with the return device has the advantages of convenience in locking and unlocking, relatively good safety and stability, and good versatility.

DETAILED DESCRIPTION

Figure 1:
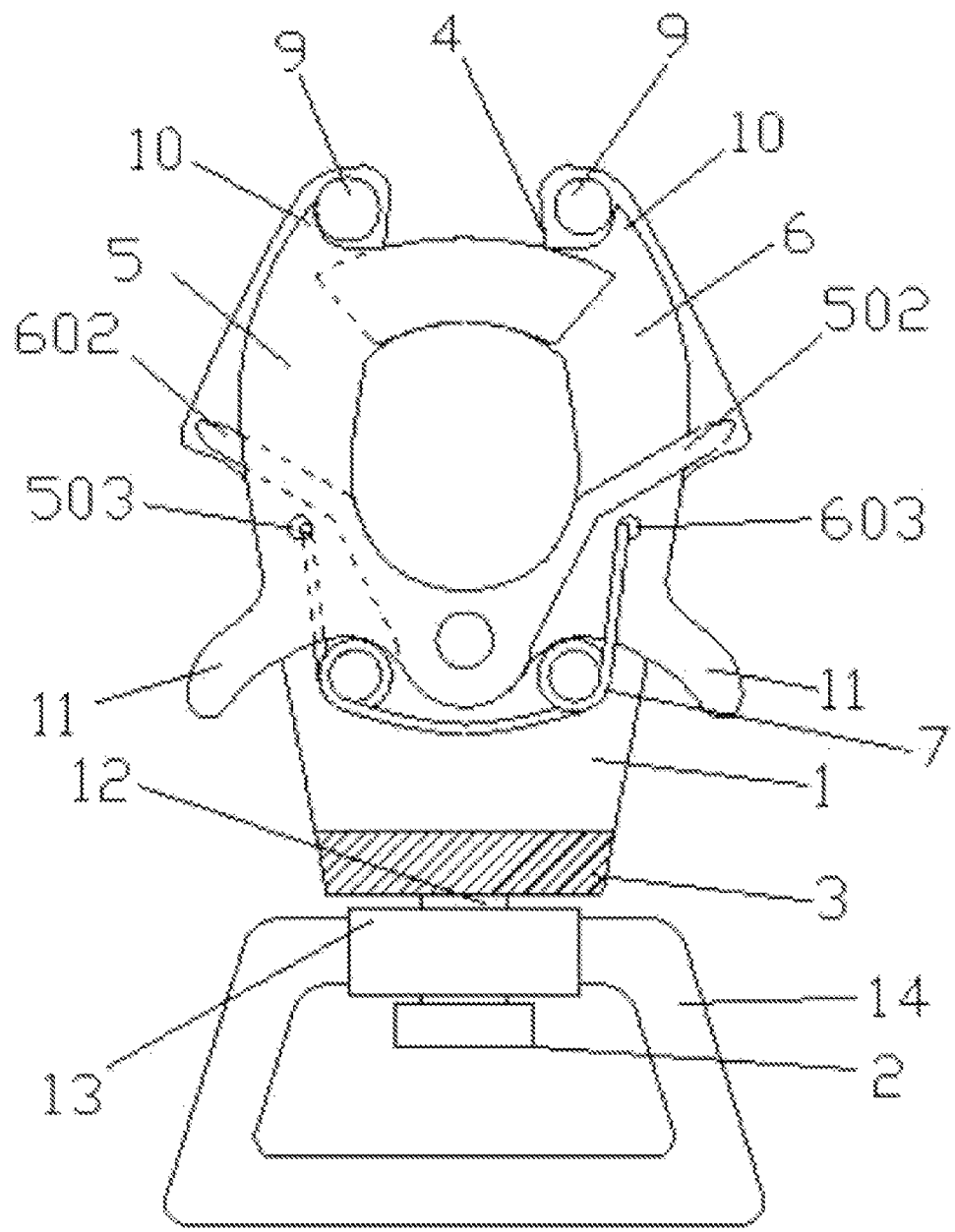
FIG. 1 is a schematic diagram of assembly of a quick opening and closing buckle provided by a patent with the publication number of CN212728442U.
Figure 2:
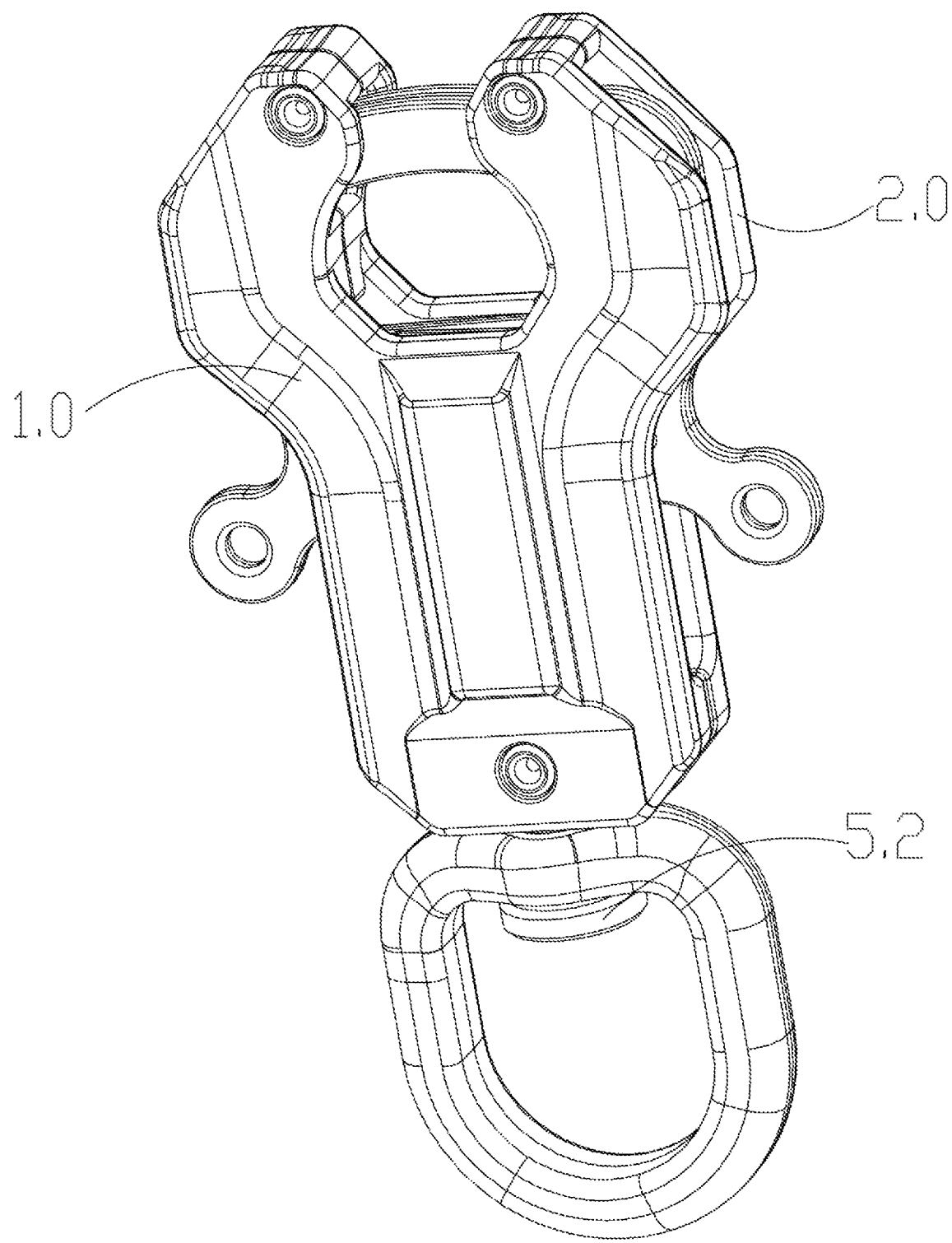
FIG. 2 is a perspective view of a connecting buckle according to the present application.

The present application provides a connecting buckle with a return device. To make the objectives, technical solutions and effect of the present application clearer and more definite, the present application is further described in detail with reference to the accompanying figures and embodiments. It should be understood that the specific embodiments described therein are merely illustrative of the present application and are not used for limit the present application.

The present application provides a connecting buckle with a return device, the structure of which is shown in FIG. 2 to FIG. 10, including an upper cover 1.0 and a lower cover 2.0 disposed correspondingly, where U-shaped connecting grooves 1.1 are correspondingly formed in the head ends of the upper cover 1.0 and the lower cover 2.0 respectively, two first riveting shafts 3.0 are disposed on two sides of the connecting grooves 1.1, a second riveting shaft 4.0 and buckle ring installing grooves 1.2 are disposed at the tail ends of the upper cover 1.0 and the lower cover 2.0, a buckle ring fixing shaft 5.0 is disposed in the buckle ring installing grooves 1.2, a buckle ring 5.1 is disposed at the tail end of the buckle ring fixing shaft 5.0, a buckled cavity 6.0 is formed between the upper cover 1.0 and the lower cover 2.0, a rotating shaft 6.1, a locking device 7.0 and a return device 8.0 are disposed in the buckled cavity 6.0, and the locking device 7.0 and the return device 8.0 are disposed correspondingly.

The locking device 7.0 includes an upper locking tongue 7.1 and a lower locking tongue 7.2 disposed correspondingly, where the upper locking tongue 7.1 is provided with an upper locking groove 7.11 with an opening on the right side, an upper rotating hole 7.12 corresponding to the rotating shaft 6.1 is formed in the tail end of the upper locking tongue 7.1, an upper shift lug 7.13 is protrusively disposed on the left side of the upper locking tongue 7.1, the lower locking tongue 7.2 is provided with a lower locking groove 7.21 with an opening on the left side, a lower rotating hole 7.22 corresponding to the rotating shaft 6.1 is formed in the tail end of the lower locking tongue 7.2, a lower shift lug 7.23 is protrusively disposed on the right side of the lower locking tongue 7.2, a limit stopper 6.2 for blocking the upper shift lug 7.13 and the lower shift lug 7.23 are disposed at the bottom of the buckled cavity 6.0, a locking spring abutting against the tail ends of the upper locking tongue 7.1 and the lower locking tongue 7.2 is also disposed at the bottom of the buckled cavity, and a closed ring is formed between the head ends of the upper locking tongue 7.1 and the lower locking tongue 7.2 as well as the connecting grooves 1.1 due to an elastic force of the locking spring.

The return device 8.0 includes an upper return tongue 8.1 and a lower return tongue 8.2 that are L-shaped and disposed correspondingly, where the head end of the upper return tongue 8.1 is hinged to the head end of the lower locking tongue 7.2, the head end of the lower return tongue 8.2 is hinged to the head end of the upper locking tongue 7.1, the tail ends of the upper return tongue 8.1 and the lower return tongue 8.2 are hinged to each other, and the upper return tongue 8.1 and the lower return tongue 8.2 are located on the outer side of the connecting grooves 1.1 due to the elastic force of the locking spring.

Figure 5:
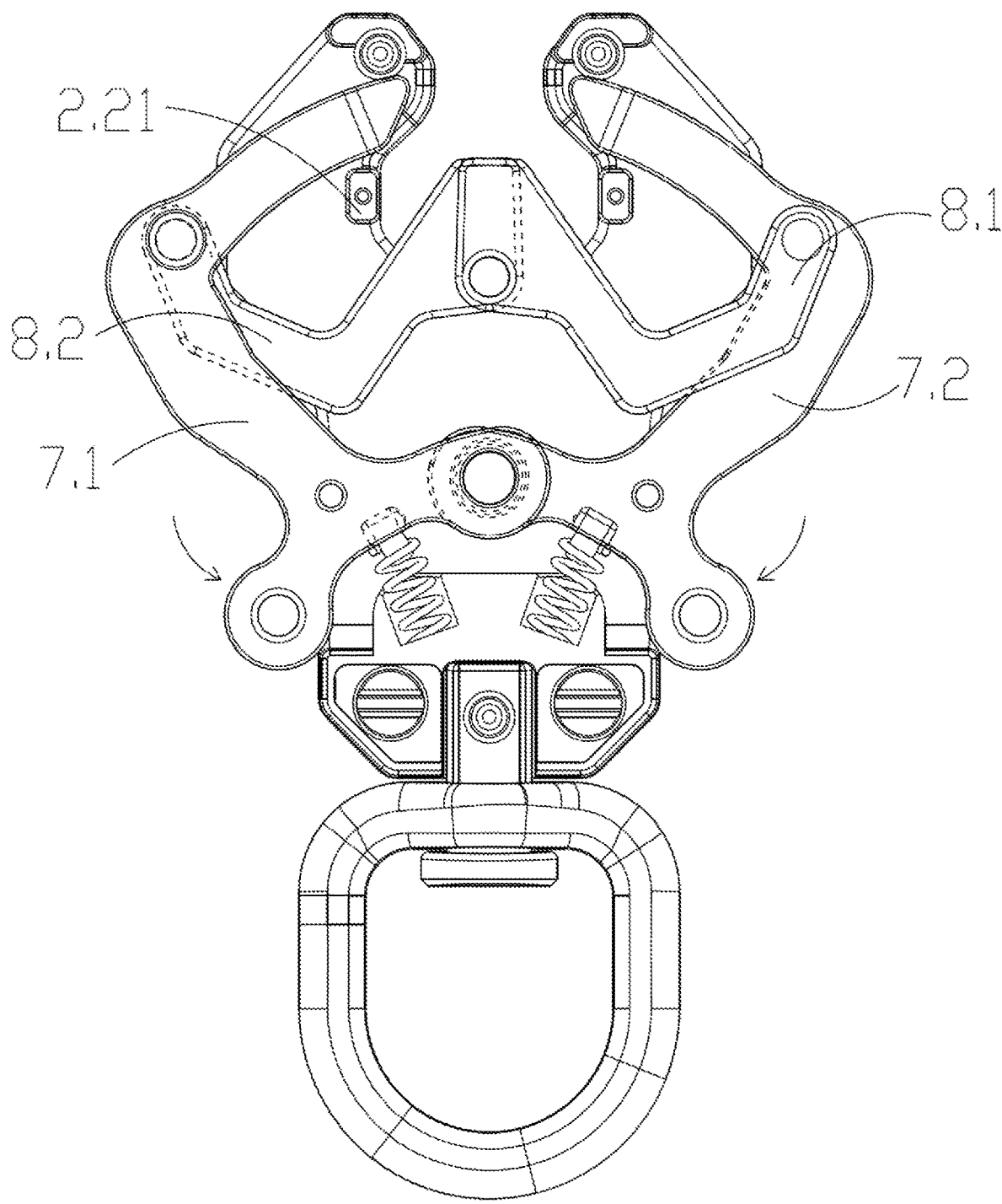
FIG. 5 is a top view, in which an upper cover is hidden, of a connecting buckle according to a first embodiment of the present application, when the connecting buckle is in an unlocked state.
Figure 6:
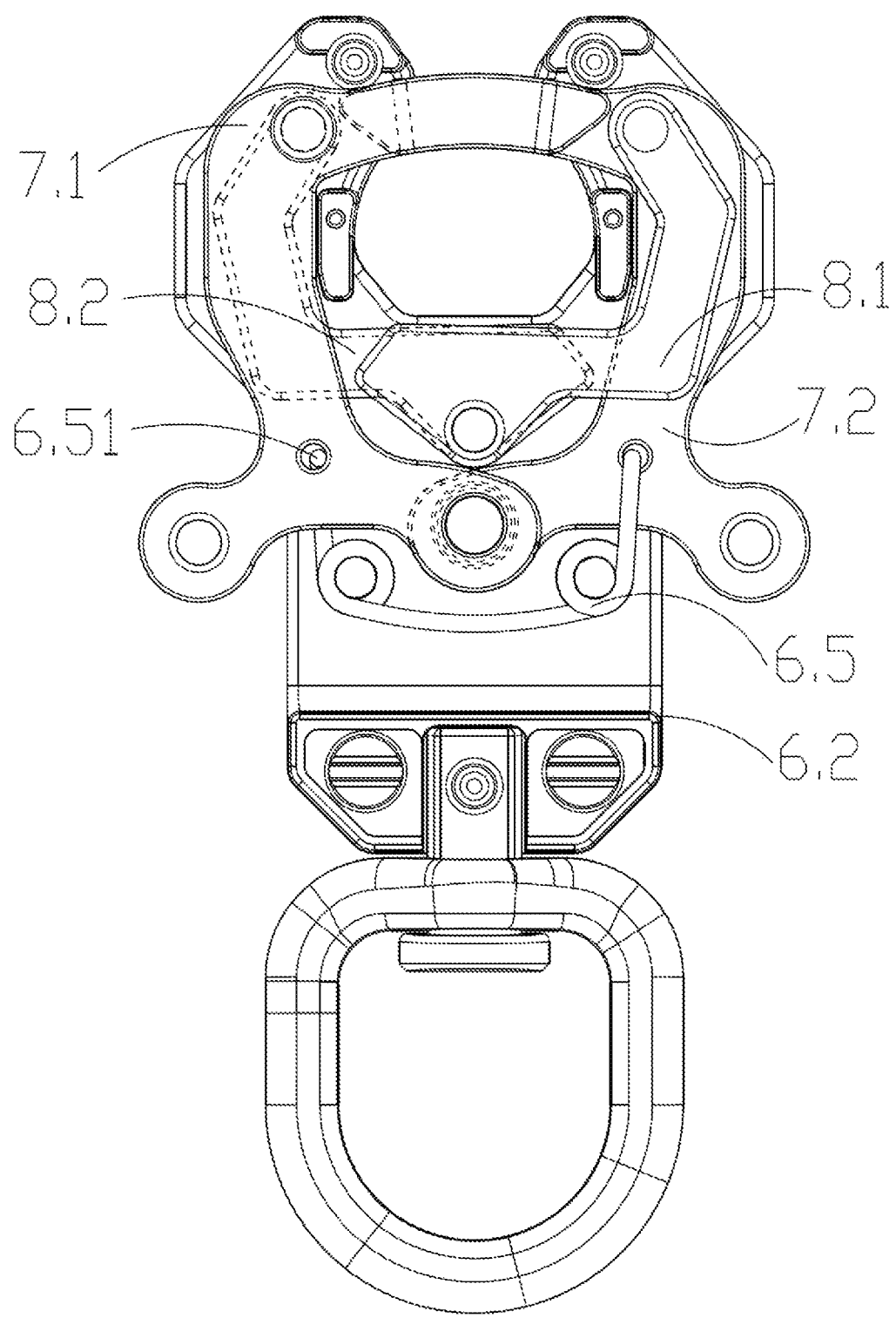
FIG. 6 is a top view, in which an upper cover is hidden, of a connecting buckle according to a second embodiment of the present application, when the connecting buckle is in a locked state.
Figure 7:
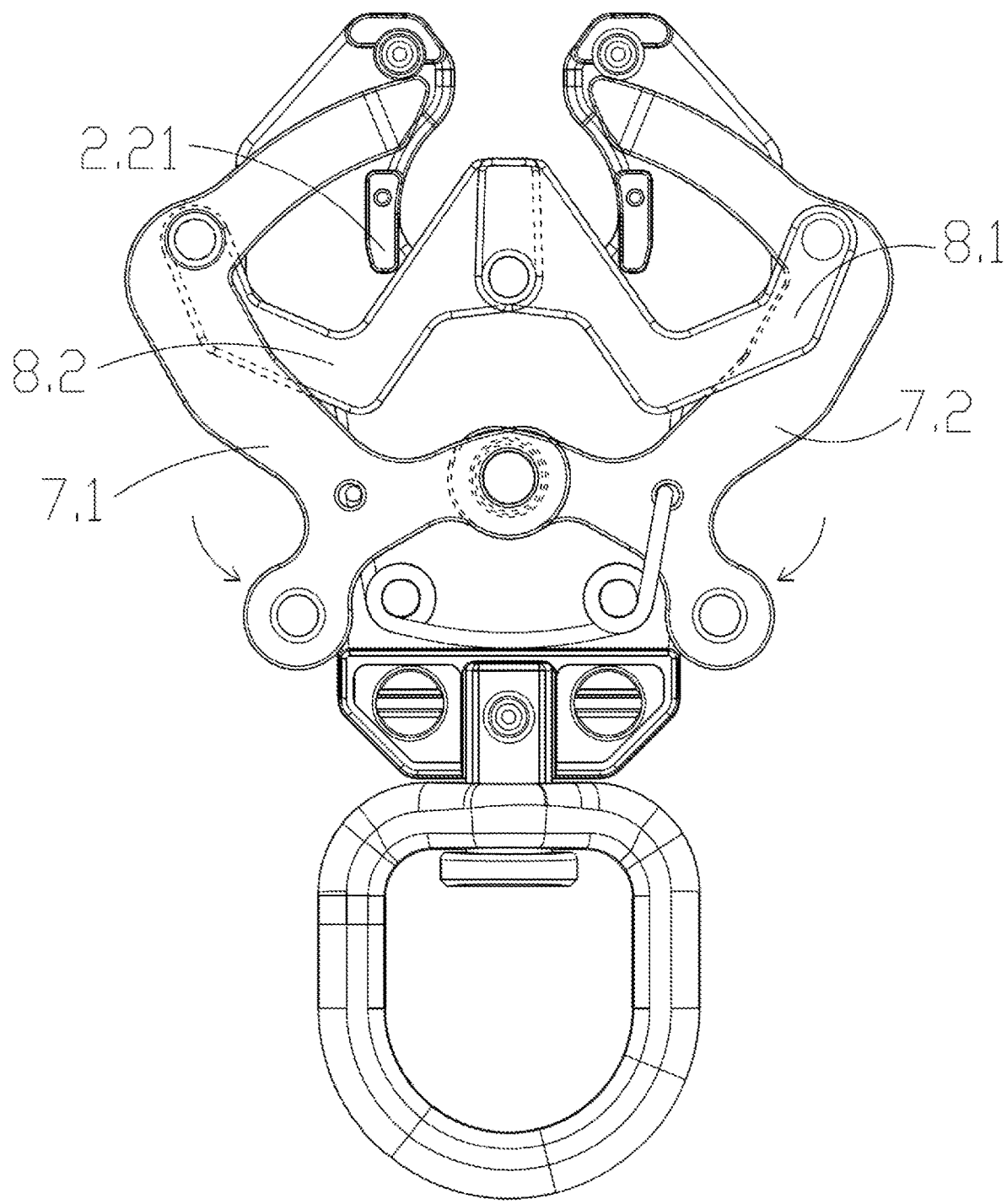
FIG. 7 is a top view, in which an upper cover is hidden, of a connecting buckle according to a second embodiment of the present application, when the connecting buckle is in an unlocked state.
Figure 8:
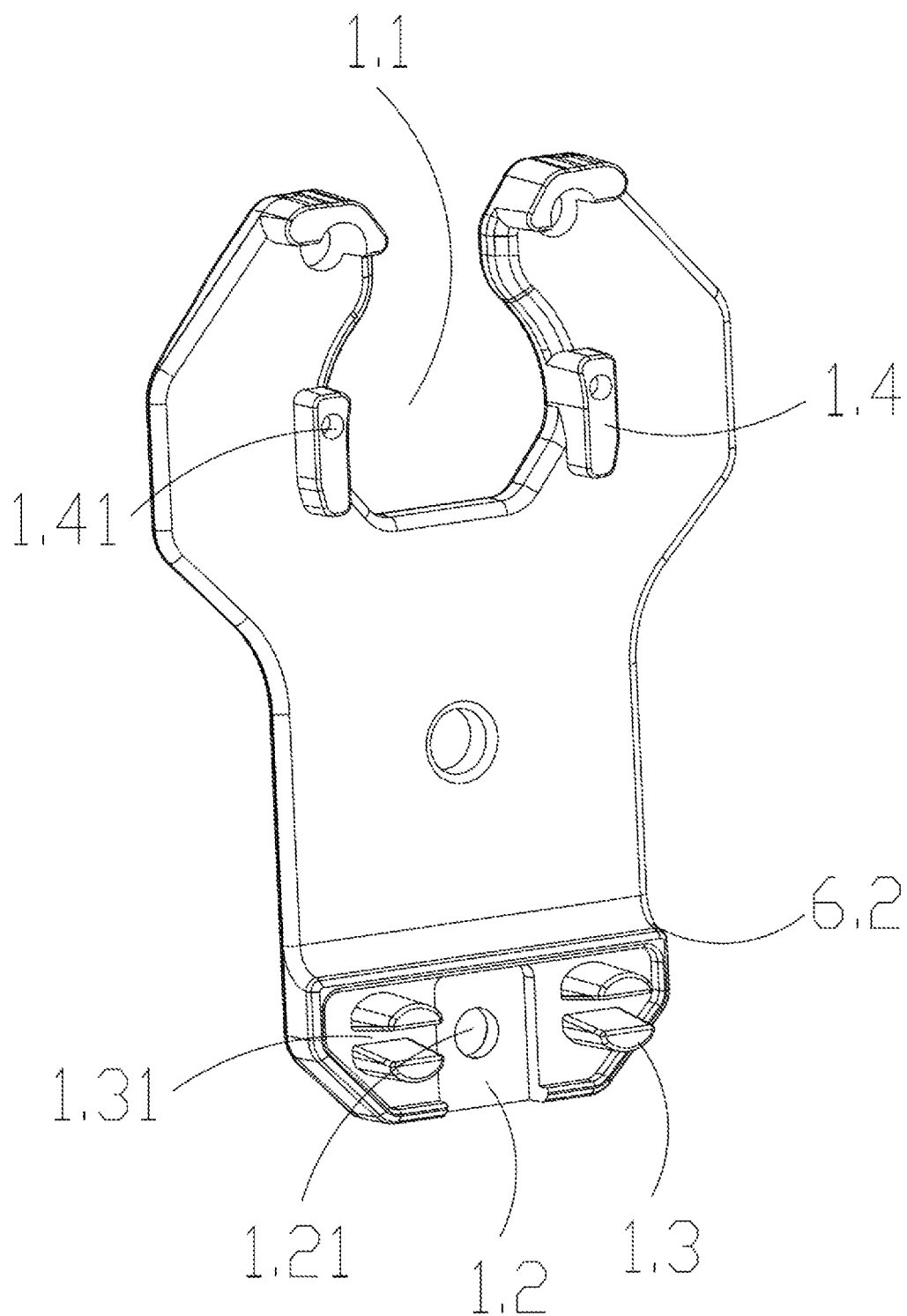
FIG. 8 is a perspective view of an upper cover in a second embodiment according to the present application.
Figure 9:
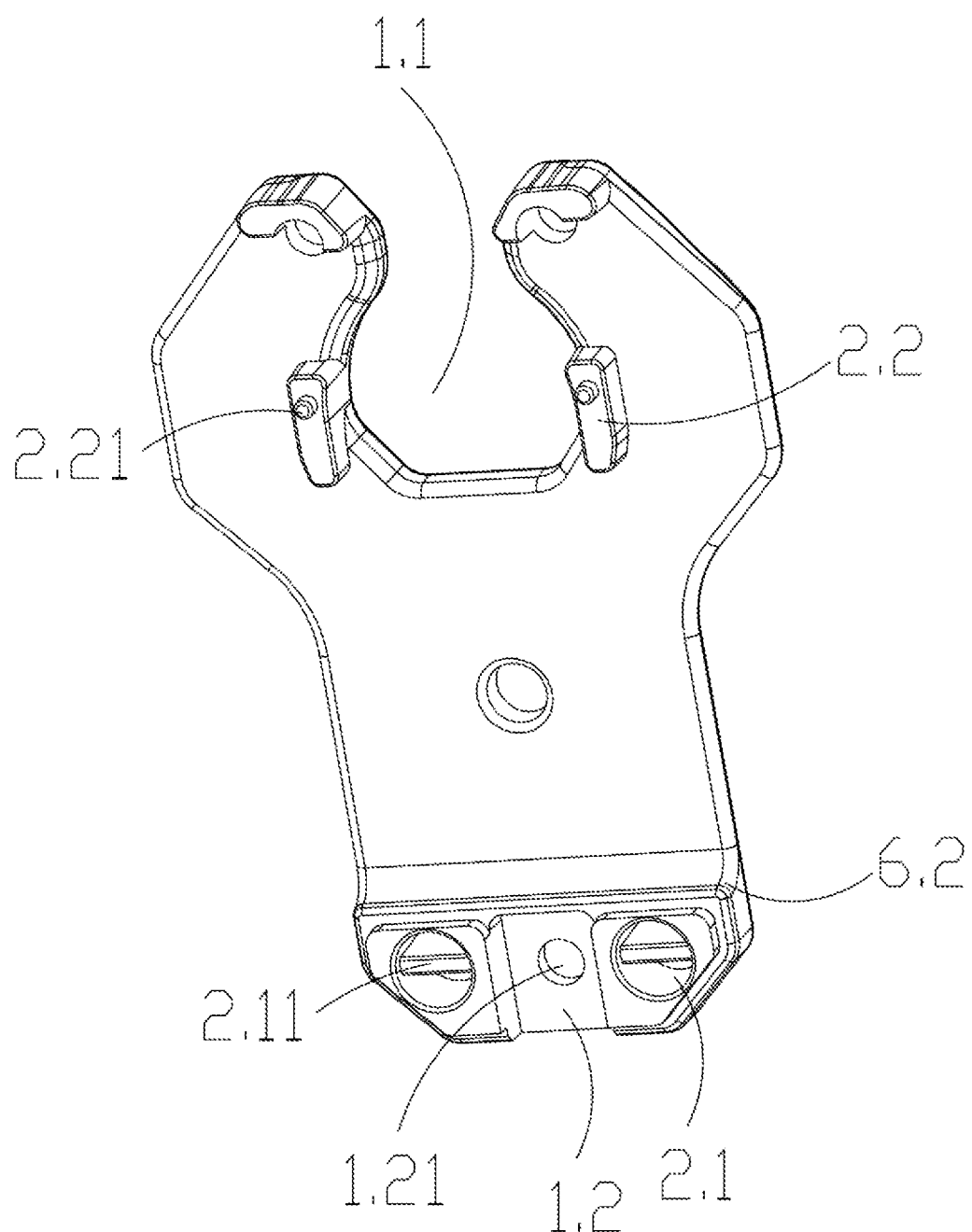
FIG. 9 is a perspective view of a lower cover in a second embodiment according to the present application.
Figure 10:
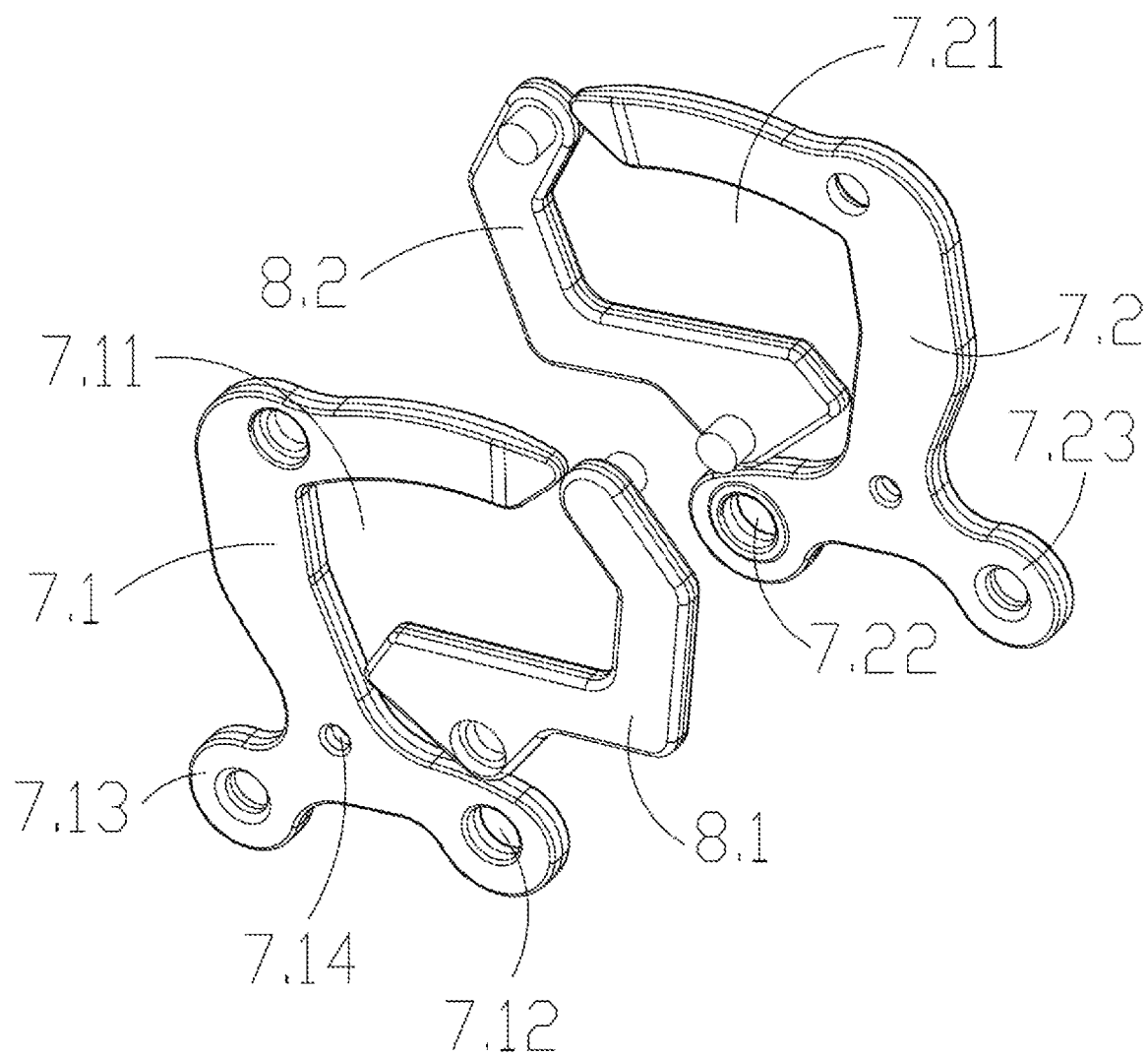
FIG. 10 is a schematic diagram of assembly of a locking device and a return device in a second embodiment according to the present application.

When no external force is applied to the upper shift lug 7.13 and the lower shift lug 7.23, the closed ring is formed between the head ends of the upper locking tongue 7.1 and the lower locking tongue 7.2 as well as the connecting grooves 1.1 due to the elastic force of the locking spring, so that the upper return tongue 8.1 and the lower return tongue 8.2 are located on the outer side of the connecting grooves 1.1. In this case, the connecting buckle is in a locked state. When acting forces as shown in FIG. 5 and FIG. 7 are applied to the upper shift lug 7.13 and the lower shift lug 7.23 at the same time, the upper locking tongue 7.1 has torque to rotate counterclockwise around the rotating shaft 6.1, and the lower locking tongue 7.2 has torque to rotate clockwise around the rotating shaft 6.1; since the head end of the upper return tongue 8.1 is hinged to the head end of the lower locking tongue 7.2, the head end of the lower return tongue 8.2 is hinged to the head end of the upper locking tongue 7.1, and the tail ends of the upper return tongue 8.1 and the lower return tongue 8.2 are hinged to each other, the head end of the upper return tongue 8.1 move to the lower left side, the head end of the lower return tongue 8.2 moves to the lower right side, the upper return tongue 8.1 and the lower return tongue 8.2 rotate in opposite directions, and the hinge ends of the upper return tongue and the lower return tongue move in a direction close to the connecting grooves 1.1 until the upper shift lug 7.13 and the lower shift lug 7.23 reach the position of the limit stopper 6.2; in this case, the head end of the upper locking tongue 7.1 and the head end of the lower locking tongue 7.2 both leave the openings of the connecting grooves 1.1, a connecting ring of a pet collar can be put into the connecting grooves 1.1 along the openings of the connecting grooves 1.1, and the connecting ring of the pet collar applies pressure to the hinged ends of the upper return tongue 8.1 and the lower return tongue 8.2, so that a hand controlling the upper shift lug 7.13 and the lower shift lug 7.23 feels a relatively large counter-acting force, and by loosening the upper shift lug 7.13 and the lower shift lug 7.23, the pressure on the hinged ends of the upper return tongue 8.1 and the lower return tongue 8.2 make the connecting buckle be quickly returned to the locked state. When the connecting buckle and the pet collar are disconnected, the hinged ends of the upper return tongue 8.1 and the lower return tongue 8.2 push the connecting ring of the pet collar to a position close to the openings of the connecting grooves 1.1, which is convenient to remove the connecting ring of the pet collar from the connecting grooves 1.1. The connecting buckle of such structure is convenient to apply forces to the upper shift lug 7.13 and the lower shift lug 7.23 for shifting. The return device 8.0 enables the connecting buckle to be quickly locked after the connecting ring of the pet collar reaches the interior of the connecting grooves 1.1, and both locking and unlocking are convenient and quick.

When unlocking, if an acting force is applied to the upper shift lug 7.13 alone, since the head end of the upper locking tongue 7.1 is hinged to the head end of the lower return tongue 8.2, the tail ends of the lower return tongue 8.2 and the upper return tongue 8.1 are hinged to each other, and the head end of the upper return tongue 8.1 is hinged to the head end of the lower locking tongue 7.2, the opening of the connecting grooves 1.1 is closed by the head end of the lower locking tongue 7.2 due to the elastic force of the locking spring, so that the front end of the upper locking tongue 7.1 trends to move to the right, and thus the state of closing the opening of the connecting grooves 1.1 is maintained. In this way, the situation that the service life is relatively short due to uneven stress of the locking spring is avoided, and the connecting buckle has better safety.

Figure 3:
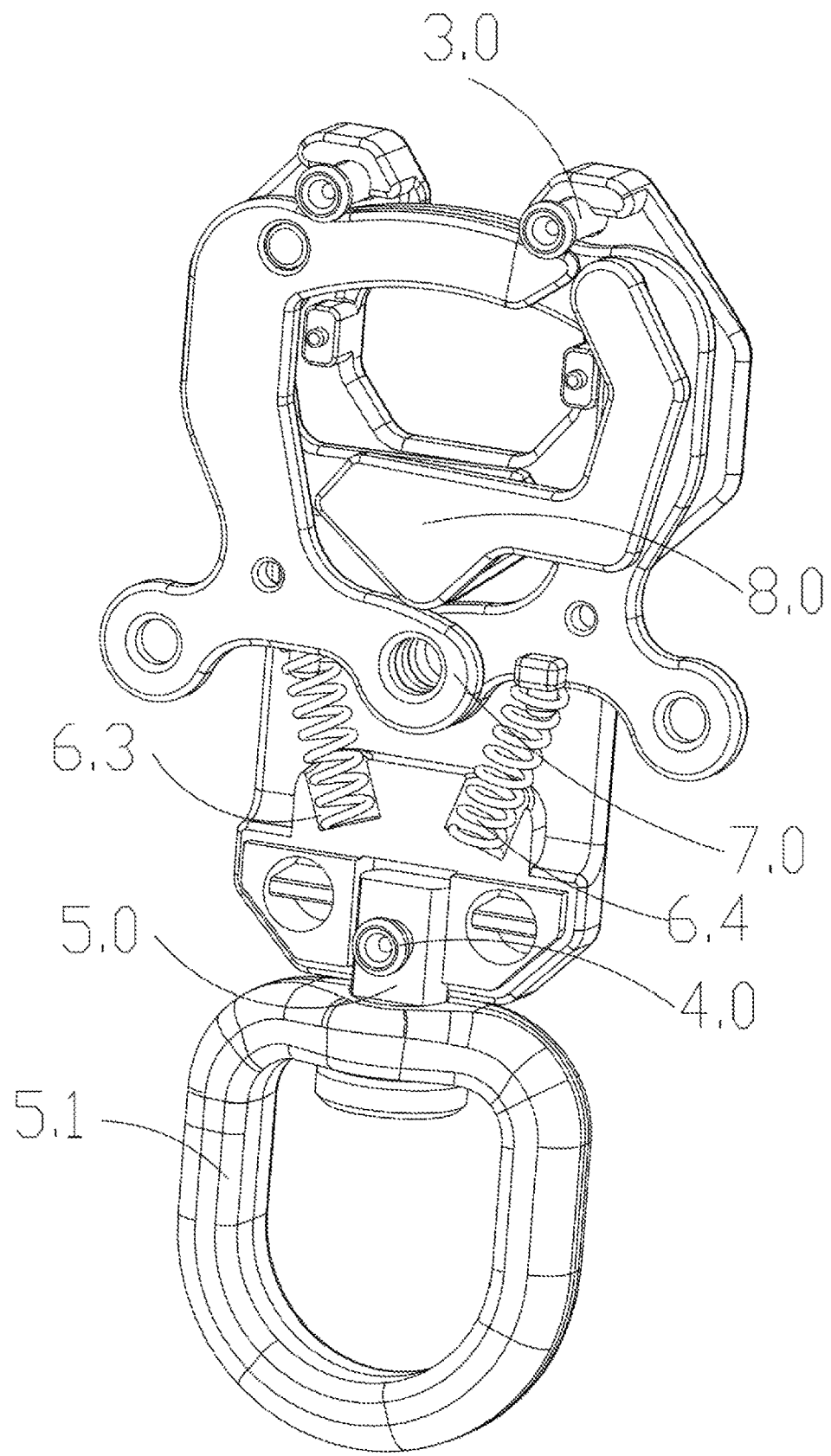
FIG. 3 is a perspective view, in which an upper cover is hidden, of a connecting buckle according to a first embodiment of the present application, when the connecting buckle is in a locked state.
Figure 4:
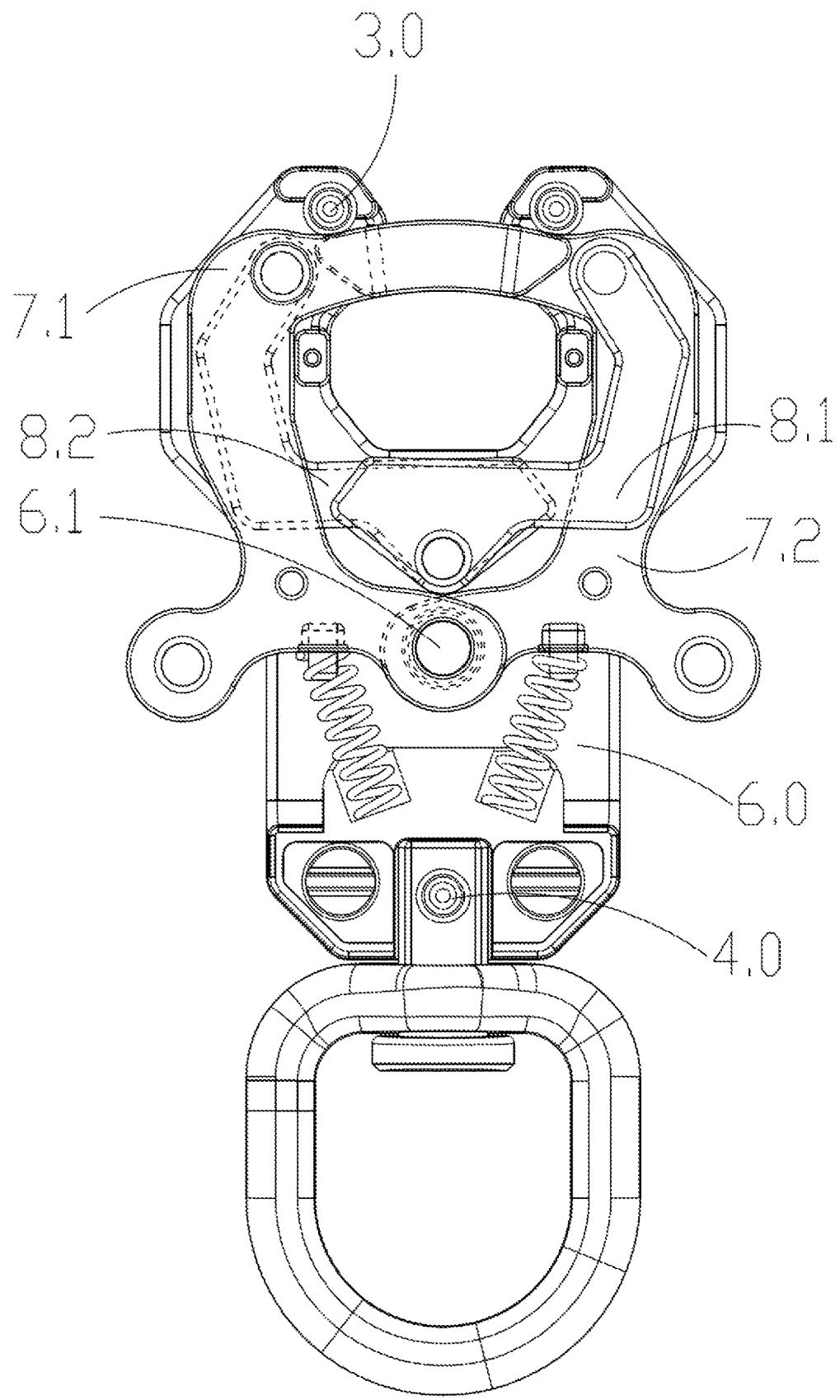
FIG. 4 is a top view, in which an upper cover is hidden, of a connecting buckle according to a first embodiment of the present application, when the connecting buckle is in a locked state.

Specifically, in a first embodiment shown in FIG. 3 to FIG. 5, two corresponding spring fixing grooves 6.3 are formed in the bottom of the buckled cavity 6.0, the locking spring is compression springs 6.4 disposed in the two spring fixing grooves 6.3 respectively, and spring installing shafts are protrusively disposed at the tail ends of the upper locking tongue 7.1 and the lower locking tongue 7.2, to prevent the compression springs 6.4 from being displaced or even disengaged. The two compression springs 6.4 can avoid the situation of uneven stress of the locking spring, so that the service life of the whole connecting buckle is relatively long.

Specifically, in a second embodiment shown in FIG. 6 to FIG. 10, the locking spring is a twins torsional spring 6.5, torsional spring installing holes 7.14 are formed in the tails ends of the upper locking tongue 7.1 and the lower locking tongue 7.2, and torsional spring installing shafts 6.51 corresponding to the torsional spring installing holes 7.14 are disposed at two ends of the twins torsional spring 6.5. Two ends of the twins torsional spring 6.5 have opposite acting forces, so that the locking device 7.0 and the return device 8.0 operate more stably, and the while connecting buckle has relatively good opening and closing stability.

Specifically, the two first riveting shafts 3.0 abut against the head ends of the upper locking tongue 7.1 and the lower locking tongue 7.2 respectively, so that the upper locking tongue 7.1 and the lower locking tongue 7.2 move stably along preset paths, and thus the opening and closing stability of the connecting buckle is improved.

Specifically, when the upper shift lug 7.13 and the lower shift lug 7.23 are in contact with the limit stopper 6.2, the hinged ends of the upper return tongue 8.1 and the lower return tongue 8.2 are overlapped and flush with each other.

When the connecting buckle is in an unlocked state, the connecting ring of the pet collar is located at the tail ends of the upper return tongue 8.1 and the lower return tongue 8.2. Even the connecting buckle trends to be locked due to the counter-acting force of the locking spring, the connecting ring of the pet collar will not get stuck between the upper return tongue 8.1 and the lower return tongue 8.2, which causes the situation that the pet collar is difficult to unlock, ensuring effective unlocking of the connecting buckle.

Specifically, two corresponding positioning columns 1.3 are protrusively disposed at the tail end of the upper cover 1.0, and two positioning grooves 2.1 corresponding to the positioning columns 1.3 are disposed at the tail end of the lower cover 2.0. When assembling the connecting buckle, the upper cover 1.0 and the lower cover 2.0 can be positioned by means of the positioning columns 1.3 and the positioning grooves 2.1, which is convenient for a subsequent riveting process, avoids an assembly position deviation and ensures the assembly quality of the connecting buckle. A guiding groove 1.31 of which the width is gradually reduced is formed in the middle of each positioning column 1.3, and a guiding column 2.11 corresponding to the guiding groove 1.31 is disposed in the middle of each positioning groove 2.1 The guiding grooves 1.31 and the guiding columns 2.11 are convenient for assembly and positioning. Each guiding groove 1.31 separates the corresponding positioning column 1.3 into two parts, so that the positioning column 1.3 has the effect of tightening in the guide groove 1.31, which prevents relative displacement of the upper cover 1.0 and the lower cover 2.0 during riveting, and further improves the assembly quality of the connecting buckle.

Specifically, the upper cover 1.0 is provided with an upper limit block 1.4 corresponding to the locking device 7.0, the lower cover 2.0 is provided with a lower limit block 2.2 corresponding to the locking device 7.0, the upper limit block 1.4 and the lower limit block 2.2 are disposed correspondingly, the upper limit block 1.4 is provided with a positioning hole 1.41, and the lower limit block 2.2 is provided with a protruded positioning shaft 2.21 corresponding to the positioning hole 1.41, to facilitate accurate positioning when assembling the upper cover 1.0 and the lower cover 2.0. The upper limit block 1.4 and the lower limit block 2.2 limit the positions of the upper locking tongue 7.1 and the lower locking tongue 7.2 in the locked state, to avoid shaking of components of the connecting buckle, and improve the stability of the connecting buckle.

When the connecting buckle is in the locked state, the head ends of the upper locking tongue 7.1 and the upper return tongue 8.1 are connected, the head ends of the lower locking tongue 7.2 and the lower return tongue 8.2 are connected, the two first riveting shafts are connected to recessed portions at the head ends of the upper locking tongue 7.1 and the lower locking tongue 7.2 respectively, to limit the positions of the upper locking tongue 7.1 and the lower locking tongue 7.2 in the locked state, which also improves the stability of the connecting buckle.

Specifically, when the upper shift lug 7.13 and the lower shift lug 7.23 are in contact with the limit stopper 6.2, the tail end of the upper limit block 1.4 abuts against the upper return tongue 8.1, and the tail end of the lower limit block 2.2 abuts against the lower return tongue 8.2. Therefore, the positions of the upper return tongue 8.1 and the lower return tongue 8.2 in the unlocked state are further limited, which improves the stability of the connecting buckle.

Specifically, the buckle ring installing groove 1.2 is provided with a riveting hole 1.21 matched with the second riveting shaft 4.0, and an anti-dropping head 5.2 is disposed at the tail end of the buckle ring fixing shaft 5.0. The anti-dropping head 5.2 is fixed to the buckle ring fixing shaft 5.0. After the second riveting shaft 4.0 is removed, the buckle ring fixing shaft 5.0 can be taken out, and the buckle ring 5.1 can be replaced as required, which increases the universality of the connecting buckle.

To sum up, the present application includes the upper cover and the lower cover disposed correspondingly, where the buckled cavity is formed between the upper cover and the lower cover, the rotating shaft, the locking device and the return device are disposed in the buckled cavity, the locking device includes the upper locking tongue and the lower locking tongue disposed correspondingly, the upper rotating hole corresponding to the rotating shaft is formed in the tail end of the upper locking tongue, the lower rotating hole corresponding to the rotating shaft is formed in the tail end of the lower locking tongue, the locking spring is disposed at the bottom of the buckled cavity, the return device includes the upper return tongue and the lower return tongue that are L-shaped and disposed correspondingly, the head end of the upper return tongue is hinged to the head end of the lower locking tongue, the head end of the lower return tongue is hinged to the head end of the upper locking tongue, and the tail ends of the upper return tongue and the lower return tongue are hinged to each other. The connecting buckle with the return device has the advantages of convenience in locking and unlocking, relatively good safety and stability, and good versatility.

It should be understood that those of ordinary skill in the art can make modifications or variations in light of the above description, and all such modifications and variations should fall within the scope of the appended claims of the present application.

What is claimed is:

1. A connecting buckle with a return device, comprises: an upper cover and a lower cover disposed correspondingly, wherein U-shaped connecting grooves are correspondingly formed in the head ends of the upper cover and the lower cover respectively, two first riveting shafts are disposed on two sides of the connecting grooves, a second riveting shaft and buckle ring installing grooves are disposed at the tail ends of the upper cover and the lower cover, a buckle ring fixing shaft is disposed in the buckle ring installing grooves, a buckle ring is disposed at the tail end of the buckle ring fixing shaft, a buckled cavity is formed between the upper cover and the lower cover, a rotating shaft, a locking device and a return device are disposed in the buckled cavity, and the locking device and the return device are disposed correspondingly;

the locking device comprises an upper locking tongue and a lower locking tongue disposed correspondingly, wherein the upper locking tongue is provided with an upper locking groove with an opening on the right side, an upper rotating hole corresponding to the rotating shaft is formed in the tail end of the upper locking tongue, an upper shift lug is protrusively disposed on the left side of the upper locking tongue, the lower locking tongue is provided with a lower locking groove with an opening on the left side, a lower rotating hole corresponding to the rotating shaft is formed in the tail end of the lower locking tongue, a lower shift lug is protrusively disposed on the right side of the lower locking tongue, a limit stopper for blocking the upper shift lug and the lower shift lug are disposed at the bottom of the buckled cavity, a locking spring abutting against the tail ends of the upper locking tongue and the lower locking tongue is also disposed at the bottom of the buckled cavity, and a closed ring is formed between the connecting grooves and the head ends of the upper locking tongue and the lower locking tongue due to an elastic force of the locking spring; and the return device comprises an upper return tongue and a lower return tongue that are L-shaped and disposed correspondingly, wherein the head end of the upper return tongue is hinged to the head end of the lower locking tongue, the head end of the lower return tongue is hinged to the head end of the upper locking tongue, the tail ends of the upper return tongue and the lower return tongue are hinged to each other, and the upper return tongue and the lower return tongue are located on the outer side of the connecting grooves due to the elastic force of the locking spring.

2. The connecting buckle with a return device according to claim 1, wherein: two corresponding spring fixing grooves are formed in the bottom of the buckled cavity, and the locking spring is compression springs disposed in the two spring fixing grooves respectively.

3. The connecting buckle with a return device according to claim 1, wherein: the locking spring is a twins torsional spring, torsional spring installing holes are formed in the tail ends of the upper locking tongue and the lower locking tongue, and torsional spring installing shafts corresponding to the torsional spring installing holes are disposed at two ends of the twins torsional spring.

4. The connecting buckle with a return device according to claim 1, wherein: the two first riveting shafts abut against the head ends of the upper locking tongue and the lower locking tongue respectively.

5. The connecting buckle with a return device according to claim 1, wherein: when the upper shift lug and the lower shift lug are in contact with the limit stopper, the hinged ends of the upper return tongue and the lower return tongue are overlapped and flush with each other.

6. The connecting buckle with a return device according to claim 1, wherein: two corresponding positioning columns are protrusively disposed at the tail end of the upper cover, and two positioning grooves corresponding to the positioning columns are disposed at the tail end of the lower cover.

7. The connecting buckle with a return device according to claim 6, wherein: a guiding groove of which the width is gradually reduced is formed in the middle of each positioning column, and a guiding column corresponding to the guiding groove is disposed in the middle of each positioning groove.

8. The connecting buckle with a return device according to claim 1, wherein: the upper cover is provided with an upper limit block corresponding to the locking device, the lower cover is provided with a lower limit block corresponding to the locking device, the upper limit block and the lower limit block are disposed correspondingly, the upper limit block is provided with a positioning hole, and the lower limit block is provided with a protruded positioning shaft corresponding to the positioning hole.

9. The connecting buckle with a return device according to claim 8, wherein: when the upper shift lug and the lower shift lug are in contact with the limit stopper, the tail end of the upper limit block abuts against the upper return tongue, and the tail end of the lower limit block abuts against the lower return tongue.

10. The connecting buckle with a return device according to claim 1, wherein: the buckle ring installing groove is provided with a riveting hole matched with the second riveting shaft, and an anti-dropping head is disposed at the tail end of the buckle ring fixing shaft.

* * * * *